United States Patent
Marque-Pucheu et al.

(10) Patent No.: US 10,681,504 B2
(45) Date of Patent: Jun. 9, 2020

(54) GROUP COMMUNICATION SYSTEM FOR THE TRANSMISSION OF MULTIMEDIA DATA

(71) Applicant: AIRBUS DS SLC, Elancourt (FR)

(72) Inventors: Gérard Marque-Pucheu, Verneuil/Seine (FR); François Piroard, Fontenay-Aux-Roses (FR)

(73) Assignee: AIRBUS DS SLC, Elancourt (FR)

( * ) Notice: Subject to any disclaimer, the term of this patent is extended or adjusted under 35 U.S.C. 154(b) by 0 days.

(21) Appl. No.: 16/196,748

(22) Filed: Nov. 20, 2018

(65) Prior Publication Data
US 2019/0158986 A1 May 23, 2019

(30) Foreign Application Priority Data
Nov. 20, 2017 (FR) ...................................... 17 60942

(51) Int. Cl.
*H04W 4/06* (2009.01)
*H04W 4/02* (2018.01)
(Continued)

(52) U.S. Cl.
CPC ............. *H04W 4/06* (2013.01); *H04L 5/0053* (2013.01); *H04L 51/10* (2013.01); *H04L 51/14* (2013.01);
(Continued)

(58) Field of Classification Search
CPC ....... H04L 51/10; H04L 51/14; H04L 5/0053; H04W 4/02; H04W 4/029; H04W 4/06; H04W 4/90; H04W 72/005
See application file for complete search history.

(56) References Cited

U.S. PATENT DOCUMENTS

| 2010/0165902 A1* | 7/2010 | Kvernvik | H04L 12/189 |
| | | | 370/312 |
| 2013/0111520 A1* | 5/2013 | Lo | H04L 67/306 |
| | | | 725/35 |

(Continued)

OTHER PUBLICATIONS

Preliminary Search Report as issued in French Patent Application No. 1760942, dated Mar. 21, 2018.
(Continued)

*Primary Examiner* — Saad A. Waqas
(74) *Attorney, Agent, or Firm* — Pillsbury Winthrop Shaw Pittman LLP

(57) ABSTRACT

A system for the transmission of group multimedia data to a set of clients affiliated to a communication group, the communication system including a control entity; a signaling participating entity; a participating entity supporting a unicast distribution service, called unicast entity; a participating entity supporting a broadcast distribution service, called broadcast entity; the communication system including a software bus linking the different participating entities to convey information messages exchanged between the different participating entities, for: enabling each unicast entity to maintain a first list of multimedia clients for each communication group to which has become affiliated at least one multimedia client; maintain a second list of multimedia clients for each geographic zone; and enabling each broadcast entity to maintain a third list of multimedia clients for each communication group to which has become affiliated at least one multimedia client.

9 Claims, 2 Drawing Sheets

(51) Int. Cl.
*H04W 4/029* (2018.01)
*H04L 5/00* (2006.01)
*H04L 12/58* (2006.01)
*H04W 72/00* (2009.01)
*H04W 4/90* (2018.01)

(52) U.S. Cl.
CPC ............ *H04W 4/02* (2013.01); *H04W 4/029* (2018.02); *H04W 72/005* (2013.01); *H04W 4/90* (2018.02)

(56) References Cited

U.S. PATENT DOCUMENTS

| | | | |
|---|---|---|---|
| 2013/0294321 A1* | 11/2013 | Wang | H04W 4/06 370/312 |
| 2014/0064177 A1 | 3/2014 | Anchan | |
| 2014/0120973 A1* | 5/2014 | Agulnik | H04W 4/06 455/509 |
| 2014/0162700 A1 | 6/2014 | Zhang | |
| 2014/0372624 A1* | 12/2014 | Wang | H04L 65/60 709/231 |
| 2015/0079979 A1* | 3/2015 | Anchan | H04W 76/15 455/433 |
| 2017/0164161 A1* | 6/2017 | Gupta | H04W 4/06 |
| 2018/0103364 A1* | 4/2018 | Gholmieh | H04W 40/246 |
| 2019/0230481 A1* | 7/2019 | Yang | H04W 4/02 |

OTHER PUBLICATIONS

Airbus DS SLC: "CCA Stage 3 Draft," TETRA and Critical Communications Evolution (TCCE); Critical Communications Architecture; Part 3: Critical Communications application mobile to network interface protocol, Technical Specification, ETSI XXX XXX-X V0.0.2, Sep. 2017), retrieved from the Internet: URL: docbox.etsi.org\TCCE\TCCE\60~WGs\wg4\05~Contributions\2017\2017_10_03_WG_TCCE4#151\TCCE04(17)000022r1_CCA_Stage_3_Draft\draft_stage_3_ts_xxxxxxv0.0.2.doc, [retrieved on Sep. 28, 2017], pp. 1-41.

\* cited by examiner

GROUP COMMUNICATION SYSTEM FOR THE TRANSMISSION OF MULTIMEDIA DATA

CROSS-REFERENCE TO RELATED APPLICATIONS

This application claims priority to French Patent Application No. 1760942, filed Nov. 20, 2017, the entire content of which is incorporated herein by reference in its entirety.

FIELD

The field of the invention relates to group communication methods and systems. Group communication system designates communication systems able to distribute information from an entity—typically a communication server—to targeted client terminals; the client terminals—also designated as "multimedia client terminals", or instead "clients"—are targeted in so far as they belong to a previously defined group. To belong to a group, a client terminal has become affiliated to this group, and it then possesses means to receive and/or decrypt messages distributed for the destination of the group. A group may for example correspond to a firefighter or military type response unit. A same client terminal may belong to different groups.

The present invention notably finds application in the implementation of the MCPTT (Mission Critical Push To Talk) standard, as well as other standards of the MCS (Mission Critical Services) family. It may find an interest in the implementation of communication standards in which are involved, in a same group communication system, devices for distributing messages of broadcast type and devices for distributing messages of unicast type, to client terminals capable of evolving geographically.

BACKGROUND

Current standards for managing group communications are for example the TETRA or TETRAPOL standards. They operate according to a broadcast distribution mode. With the new communication standards, for example the MCPTT standard, general public communication networks, which have a national coverage, are however susceptible of being involved. These communication networks mainly have a unicast distribution mode, that is to say point to point.

Furthermore, the technical specifications 3GPP—24.379 (clauses 13 and 14) and 24.380 (clauses 6.4 and 10) describe the management of communications consisting in exchanges between client terminals and participation functions, hosted on at least one server type electronic device. These specifications take into account the broadcast distribution mode of the MBMS service of LTE but only manage the case where the set of participation functions are situated in a same geographic zone, and where it is not necessary to have exchanges between these different participation functions to manage the distribution to the client terminals in an optimal manner.

However, new group communication standards aim henceforth to use communication systems that involve a broadcast distribution participation function (also designated as "broadcast distribution participation function", or as "broadcast participation function"), and a unicast distribution participation function (also designated as "unicast distribution participation function", or as "unicast participation function") covering a potentially large number of client terminals and distributed over an extended territory.

Consequently, in practice, the broadcast participation function, on account of the extended territory that it has to cover, is distributed over different broadcast distribution entities, and the unicast participation functions, on account of the large number of terminals that the communication system has to manage, is also distributed between different unicast distribution entities, these distribution entities corresponding to communication modules integrated in servers, or to servers themselves.

The mobility of the client terminals, also designated as "clients", as well as the possibility that these terminals have to become affiliated, or no longer be affiliated, to a given communication group, leads to situations where the optimisation of distribution resources to the terminals is beneficial.

Thus, for example, if a given communication group that is distributed over an extended territory is considered, communications with the terminals of this group will be conducted necessarily in unicast mode.

Yet, for example in the case of a group of firefighters gathering together for a given response at a same place, the unicast distribution mode initially adopted is no longer optimal in terms of economy of radio resources when the different terminals are located near to each other: a large part of the terminals of this group henceforth being situated in a same zone, it is judicious to switch over to a broadcast distribution mode for these terminals.

Nothing in the current standards provides, for such group communications, for such a switch over in the case where the system comprises a multiplicity of unicast distribution entities and a multiplicity of broadcast distribution entities on account of the number of client terminals managed and of the geographic extent covered.

SUMMARY

In an aspect of the invention, it is sought to address this shortcoming by proposing a communication system in which the distribution of messages or media to a broadcast group is managed in an optimal manner, by making possible an operation of switching over from a broadcast distribution mode to a unicast distribution mode—and vice-versa—for certain targeted terminals; this switch over operation being made possible in such a way that, on the one hand, the set of terminals of the considered group indeed receives the messages or the media distributed to the group, and that a given terminal of the considered group does not receive messages or media in a redundant manner and this is so for configurations comprising a multiplicity of unicast distribution entities and a multiplicity of broadcast distribution entities. Thus, for a client terminal which was receiving messages or media in a unicast communication mode and which, for reasons of optimisation of the radio resources of the communication system, receives them from a certain moment in a broadcast communication mode, it is ensured in the invention that the considered client terminal does not continue to receive messages or media in unicast communication mode. It is also guaranteed that the broadcast communication will take place without duplication of messages or media in a given zone.

To this end, it is provided in the invention to establish, for the unicast participating entities and the broadcast participating entities, different lists relative to information of location and belonging to different communication groups of the terminals managed by the communication system. These context lists are updated; a distribution context is thereby defined, the updating information of these lists being permanently exchanged through a software bus linking the set of participating entities. An aspect of the invention thus essentially relates to a communication system for the transmission of group multimedia data to a set of multimedia clients, each multimedia client being affiliated to at least one communication group, the communication system comprising:

at least one control entity;

at least one signaling participating entity;

at least one participating entity supporting a unicast distribution service, called unicast entity;

at least one participating entity supporting a broadcast distribution service, called broadcast entity;

media sessions for one or more multimedia group communications being established between at least one control entity and the at least one participating entity, the at least one signaling participating entity and the at least one unicast entity each serving at least one sub-set of multimedia clients of the set of multimedia clients, independently of the geographic location of the multimedia clients;

the at least one broadcast entity serving local multimedia clients of the set of multimedia clients in a given geographic zone, independently of the signaling participating entity serving the local multimedia clients;

the communication system comprising a software bus linking the different participating entities to convey information messages exchanged between the different participating entities, the information messages comprising updating data for:

enabling each unicast entity to maintain a first list up-to-date, containing for each communication group to which has become affiliated at least one multimedia client served by the unicast entity the multimedia clients affiliated to the group and served by the unicast entity;

maintain a second list up-to-date, containing for each geographic zone in which is situated at least one multimedia client served by the unicast entity the multimedia clients situated in the geographic zone and served by the unicast entity;

enabling each broadcast entity to maintain a third list up-to-date, containing for each communication group to which has become affiliated at least one multimedia client present in the geographic zone served by the broadcast entity, among the set of multimedia clients, the multimedia clients that are affiliated to the communication group and that are present in the geographic zone.

The term "entity" used above designates one or more electronic devices, ensuring a function of which the resources may be distributed between these different electronic devices. The electronic devices in question are typically a communication module, which may be integrated in a server or which may constitute a server in itself. Thus, for example, the broadcast entity may designate each electronic modules of the set of electronic modules contributing to the implementation of the broadcast participation function. A participating entity may also be designated as "participation entity".

The system according to an embodiment of the invention may comprise one or more additional characteristics, considered individually or according to all technically possible combinations thereof, among the following:

The system comprises a unicast distribution participation function and a broadcast distribution participation function distributed respectively over a plurality of participating entities supporting a unicast distribution service, and over a plurality of participating entities supporting a broadcast distribution service.

The system comprises a signaling participation function installed on a single signaling participating entity.

In the system according to an embodiment of the invention, the emission, by a multimedia client of the set of multimedia clients, of a message of affiliation to a communication group to the signaling participating entity that manages the multimedia client causes the sending by the signalling participating entity of an affiliation information message:

on the one hand, to one of the unicast entities, the unicast entity updating the first list and the second list;

on the other hand, to one of the broadcast entities, the broadcast entity updating the third list.

Each broadcast entity emits an availability message of a broadcast distribution service in a geographic zone served by the broadcast entity, the availability message being emitted:

when a number of multimedia clients, called target clients, affiliated to a same group, called developed group, is above, in the geographic zone, a previously determined threshold;

to the set of unicast participating entities serving clients located in the geographic zone.

Each broadcast entity having emitted the availability message emits a warning message of switching over to broadcast distribution mode:

after each target client terminal has emitted a message indicating its availability to receive the broadcast distribution mode;

to the unicast entities having target clients of the developed group in the considered geographic zone, the unicast entities then ceasing to emit in unicast distribution mode to the target clients:

the broadcast distribution mode then being implemented to the target clients.

The broadcast distribution mode is maintained to each target client as long as the considered target client has not emitted an information message of broadcast reception unavailability.

The broadcast distribution service is of MBMS type for the LTE standard, or of SC-PTM type.

An aspect of the present invention also relates to a communication method for the transmission of group multimedia data to a set of multimedia clients, the method being implemented in a system according to an aspect of the invention, each multimedia client being affiliated to at least one communication group, the communication method comprising the implementation of:

at least one control entity;

at least one signaling participating entity;

at least one participating entity supporting a unicast distribution service, called unicast entity;

at least one participating entity supporting a broadcast distribution service, called broadcast entity;

media sessions for one or more multimedia group communications being established between the at least one control entity and the at least one participating entity, the at least one signalling participating entity and the at least one unicast entity each serving at least one sub-set of multimedia clients of the set of multimedia clients, independently of the geographic location of the multimedia clients;

the at least one broadcast entity serving local multimedia clients of the set of multimedia clients in a given geographic zone, independently of the signaling participating entity serving the local multimedia clients;

the communication method being characterised by the following different steps:
use of a software bus linking the different participating entities to convey information messages exchanged between the different participating entities;
updating, by means of update data of the information messages:
each unicast entity by maintaining up to date
a first list containing for each communication group to which has become affiliated at least one multimedia client served by the unicast entity the multimedia clients affiliated to the group and served by the unicast entity;
a second list containing for each geographic zone in which is situated at least one multimedia client served by the unicast entity the multimedia clients being situated in the geographic zone and served by the unicast entity;
each broadcast entity by maintaining up to date a third list containing for each communication group to which has become affiliated at least one multimedia client present in the geographic zone served by the broadcast entity, among the set of multimedia clients, the multimedia clients that are affiliated to the communication group and that are present in the geographic zone.

BRIEF DESCRIPTION OF THE FIGURES

Other characteristics and benefits of the invention will become clear from reading the detailed description that follows, with reference to the appended figures, which illustrate.

DETAILED DESCRIPTION

Unless stated otherwise, a same element present in different figures has the same reference.

Figure 1:
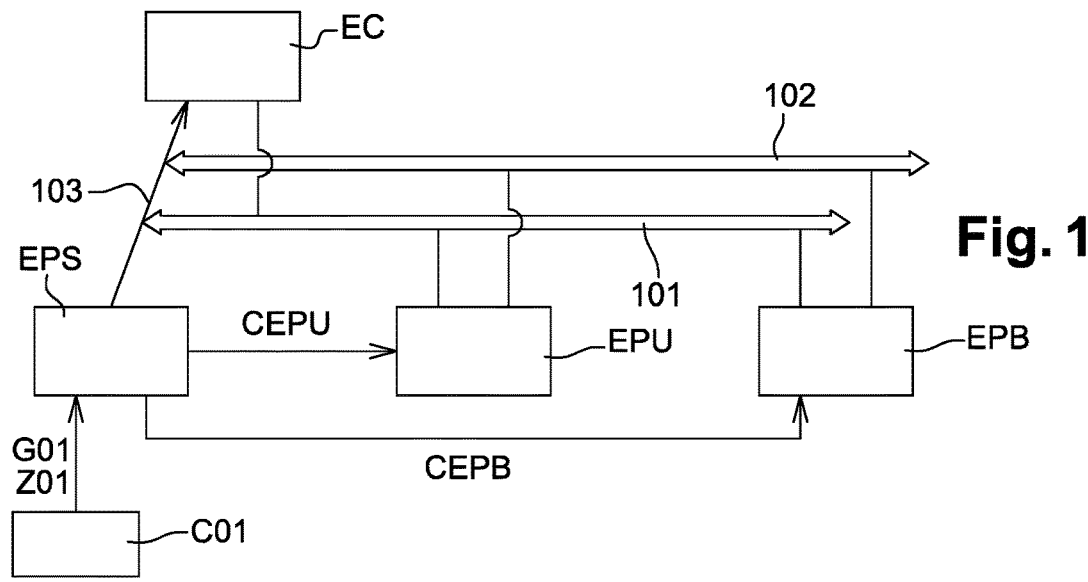
FIG. 1: a schematic representation of an example of a system according to an embodiment of the invention.

FIG. 1 shows a functional representation of the system according to an embodiment of the invention.

Different participation functions intervene in the system according to an embodiment of the invention:
a signaling participation function;
a unicast distribution participation function;
a broadcast distribution participation function.

The different participation functions are distributed over different entities, typically server type devices. In an embodiment, the server(s) include(s) hardware circuit(s) to perform its/their intended function(s). The hardware circuit(s) can include a memory encoded with machine executable instructions to perform the intended function(s) and a processor to execute the instructions. Typically, the flows managed by the signaling participation function being less important than the flows managed by the unicast and broadcast participation functions, the signaling function is beneficially concentrated on a single server, whereas the broadcast and unicast distribution participation functions will be distributed on multiple different entities, EPB and EPU. Generally speaking, the functional distribution of the participation functions over different server type devices may be any distribution.

In this figure is illustrated the fact that a client C01, for example a mobile terminal of a user, has the capacity to become affiliated to a group G01, while being present in a geographic zone Z01, by signaling itself to the signaling participating entity EPS that controls it. The signalling participating entity EPS then signals, to the control entity EC that controls the group via a link 103, the belonging of the client C01 to the group G01. The control entity serves as a focal point for the management of media in group communications. It receives from each unicast participating entity, in the uplink sense, signaling elements for the management of speech authorisations of the entities, and sends back speech authorisations after arbitration between the different participating entities. The control entity also sends back the media stream of the authorised client through the corresponding participating entity, and redistributes it to all the targeted distribution participating entities so that they carry out the distribution to the clients in unicast or broadcast mode depending on the case.

It should be noted that a same client may be affiliated to one group or to several distinct groups.

A signaling participating entity EPS is capable of emitting information for the destination of one or more unicast distribution participating entities EPU and one or more broadcast distribution participating entities EPB. This information transmitted by a signaling entity is transmitted in the form of commands, called CEPU commands (destined for a unicast participating entity EPU) and CEPB commands (destined for a broadcast participating entity EPB). These CEPU and CEPB commands are called context creation commands and enable the distribution participating entities EPB and EPU to constitute different lists, which will be detailed in FIG. 2. The commands are listed in a summary table that will be detailed in the margin of the description of FIG. 3. The different lists thereby constituted form what is called a context.

According to an embodiment of the invention, the following are provided:
a first communication stream 101, which enables the exchange of the media to distribute for a given group and of its associated signalling, between the control entity EC and the unicast and broadcast participating entities EPU and EPB. These exchanges may be carried out using multicast addresses corresponding to the communication groups to which are affiliated the served client terminals.
a second flow 102 which enables an exchange of information between the unicast and broadcast distribution participating entities EPU and EPB using multicast addresses corresponding to the geographic zones in which the served client terminals are situated. The stream 102 forms a software bus of which the commands are listed in the summary table that will be detailed in the margin of the description of FIG. 3.

Figure 2:
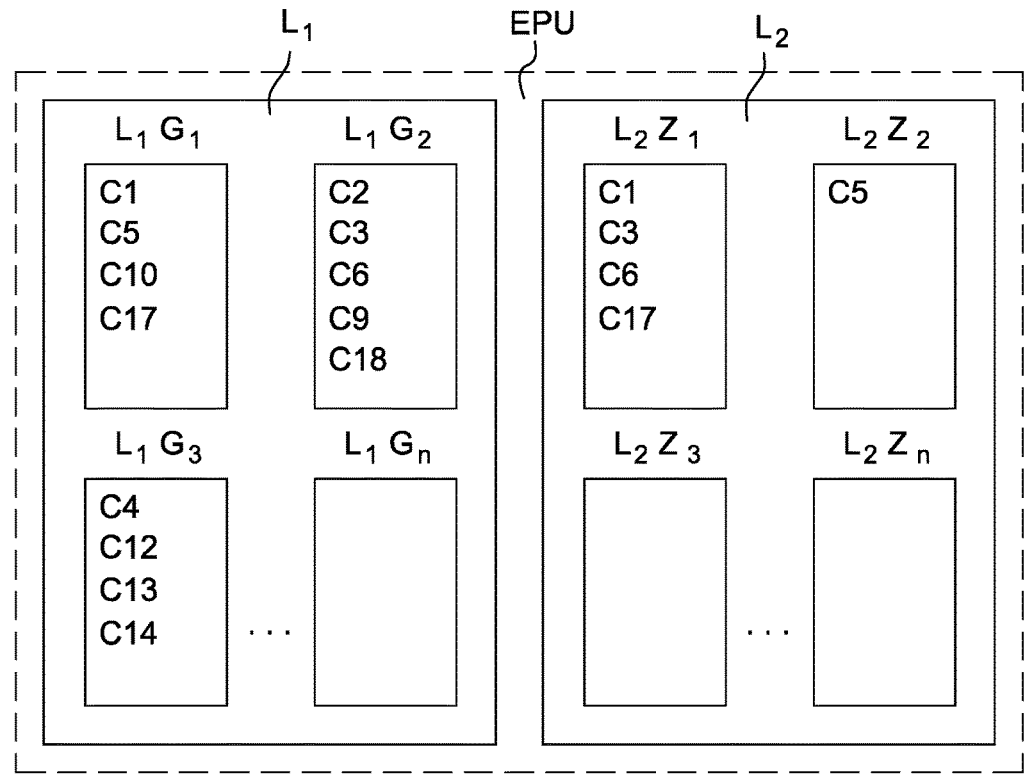
FIG. 2: a schematic representation of a context of the invention, constituted of different lists of terminals intervening in the system according to the invention.
Figure 2:
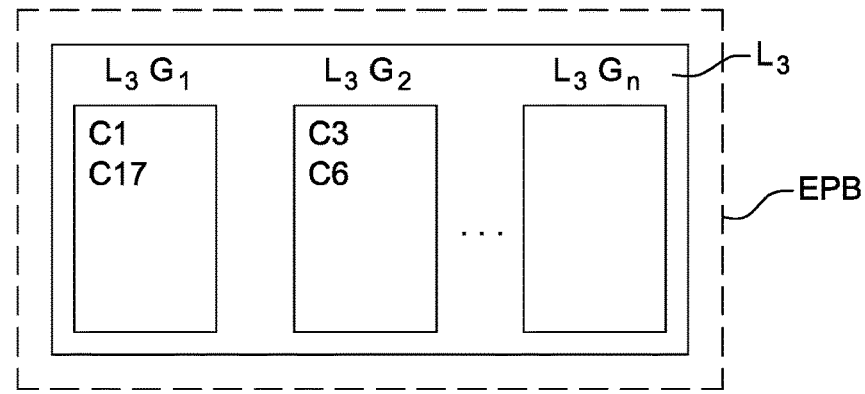

In FIG. 2 is represented what is designated in the invention as a context. The context is formed of three sets of lists:
first lists L1 are managed and organised by the unicast participating entities EPU, which organise by group the different clients intervening in the system according to the invention and which are served by each of the unicast participating entities;
second lists L2 are managed and organised by the unicast participating entities EPU, which organise by zone the different clients intervening in the system according to the invention and which are served by each of the unicast participating entities;

third lists L3 are managed and organised by broadcast participating entities EPB, which organise, for a given geographic zone, by group the different clients intervening in the system according to the invention and situated in the zone served by each of the broadcast participating entities.

It is thus understood, with regard to FIGS. 1 and 2, that each of the unicast distribution participating entities is in constant communication with all the broadcast distribution participating entities that serve zones where the clients that it controls are located. This can easily be carried out thanks to the existence of a multicast address for each of the zones covered by the system according to an embodiment of the invention, a modification of information relative to a client—for example a change of zone—is taken into consideration by the whole of the context by an updating of the lists L1, L2 and L3 by means of the information conveyed on the software bus 102.

The function of the software bus is to ensure the coherence of the information contained in the different lists L1, L2 and L3, in order that the different participating entities, unicast and broadcast, can decide in coherence on a unicast or broadcast distribution mode to each considered client of the system. Such a decision to switch over between a unicast and broadcast distribution mode thus does not involve the control entity.

Figure 3:
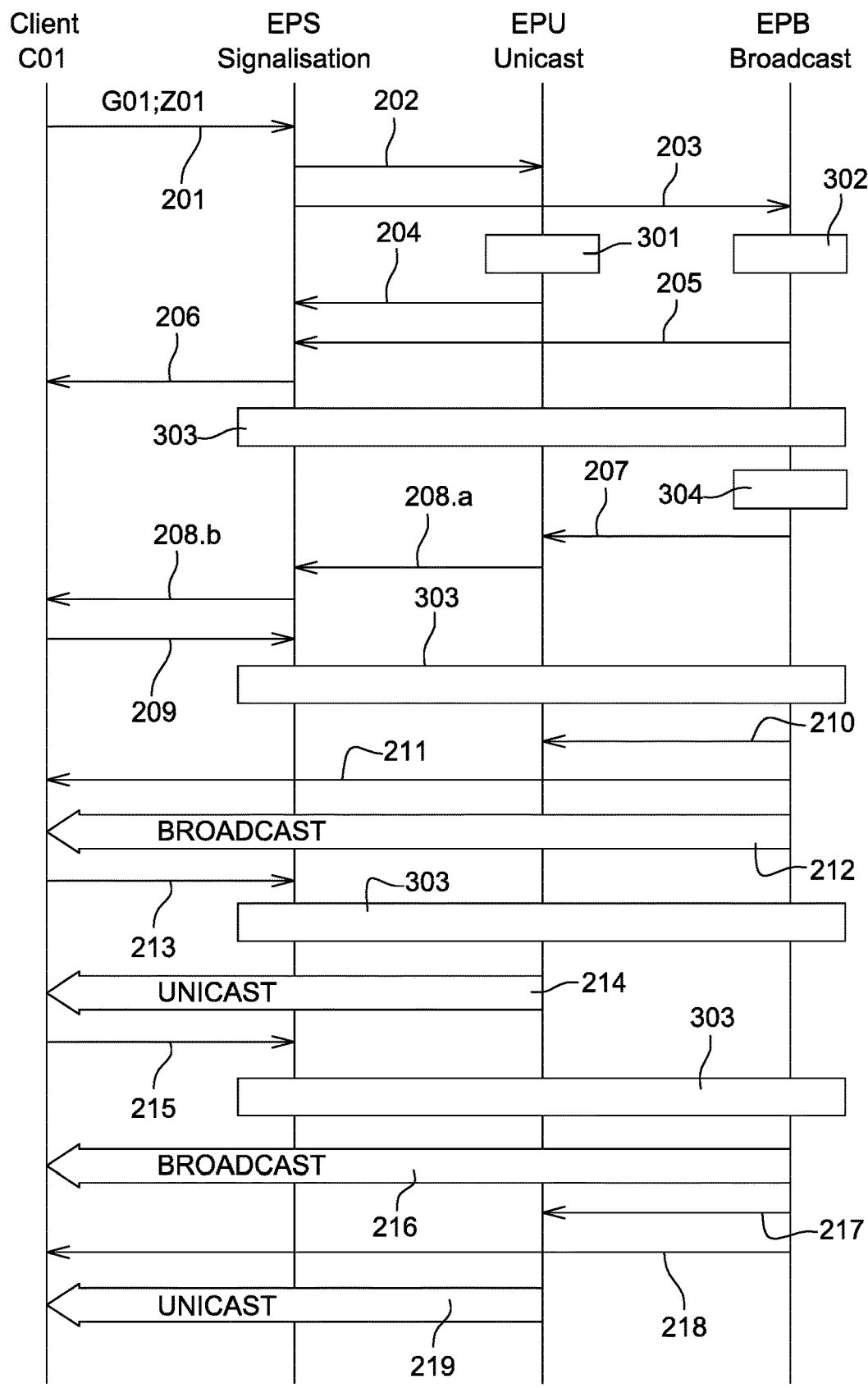
FIG. 3: an exemplary embodiment of exchanges of messages between the different entities of the system according to an embodiment of the invention.

In FIG. 3 is represented an example of exchanges capable of intervening between the different participating entities (signalling, unicast and broadcast) and a client in an exemplary embodiment of the invention within the context of the MCPTT specification using the MBMS service of LTE.

In a first step 201, a client C01, of MCPTT client type, present in a zone Z01 becomes affiliated to a group G01 by sending an affiliation message complying with the MCPTT standard to the signaling participating entity EPS that controls this client. It thus signals that it wishes to receive messages destined for the group G01, while indicating its geographic location in a zone Z01 thanks to a SIP PANI (P-Access Network Information) header. This affiliation message may or may not be accompanied by a session opening request.

The signaling participating entity EPS thus receives the message of affiliation of the client C01 and is consequently going to cause the adaptation of the lists L1, L2 and L3 of the context by sending this information of affiliation of the client C01:

on the one hand, in a step 202, to a unicast distribution participating entity EPU; the unicast entity EPU thus records, in an operation 301, the presence of the client C01 both in the first list L1 corresponding to the considered group and in the second list L2 corresponding to the considered zone. If the client C01 is the first client of the group G01, the unicast entity carries out an operation of junction to a group multicast address for the group G01 (JOIN for IP multicast). In the same way, if the client C01 is the first client in the zone Z01, the unicast entity carries out an operation of junction to a zone multicast address for the zone Z01. The unicast distribution participating entity EPU then emits, in a step 204, an acknowledgement message to the signaling participating entity EPS, by communicating to it the different addresses and port numbers created for the unicast distribution of the flows corresponding to the group G01 to the client C01 and therefrom.

on the other hand, in a step 203, to the broadcast participating entity EPB serving the zone Z01 indicates in a PANI header; the broadcast participating entity EPB thus records, in an operation 302, the presence of the client C01 in the third list L3. If the client C01 is the first client of the group G01, the broadcast participating entity EPB carries out an operation of junction to the group multicast address for the group G01. The broadcast participating entity EPB then emits, in a step 205, an acknowledgement message to the signaling participation function EPS.

The signaling participating entity EPS is able to determine, from the zone information Z01 and the group information G01 respectively to which broadcast participating entity and to which unicast participating entity it has to send the information of affiliation of the client C01.

In a following step 206, the signaling participating entity EPS emits for the destination of the client C01 an affiliation confirmation message, optionally accompanied by confirmation of the opening of a session using the addresses and ports received from the unicast participating entity at step 204.

From this step, as soon as the client C01 changes group (by withdrawing from a group or by joining a new group) or geographic zone, an operation 303 of updating the context is carried out to update the lists L1, L2 and L3. The exchanges of information for this purpose are carried out via the software bus 102.

In an operation 304, a broadcast participating entity EPB determines if, for the geographic zone that it serves, the number of clients present, for a given group, is above a previously determined threshold, called triggering threshold. This threshold may be variable as a function of the considered geographic zones, or even considered groups.

In the affirmative, the broadcast participating entity EPB emits, in a step 207, for the destination of the unicast participating entities EPB serving clients located in a zone served by the broadcast distribution entity EPB, a message indicating that the broadcast distribution service is available. The message is addressed by the software bus 102 and is thus received by the set of unicast distribution entities serving one or more clients in the considered zone Z01 thanks to the junction operation carried out during the operation 301.

The unicast participating entity EPU then communicates this information to the signaling participating entity EPS that controls it in a step 208-a, and does so for each terminal C01 situated in the considered zone Z01. The signaling participating entity EPS then sends this information of opening of a broadcast session in the zone Z01 to the terminal C01 in a step 208-b. Generally speaking, the unicast participating entity EPU communicates the information of opening of a broadcast distribution service in the considered zone Z01 by using the second list L2, and by sending it to all the clients of this second list L2 for the concerned zone Z01 via the signaling participating entity EPS.

The terminal C01 then emits, in a step 209, on reception of the information message of availability of a broadcast distribution in the zone where it is situated, a message indicating its state of reception of the distribution and confirming its presence in the broadcast distribution zone, and thus its availability to receive the broadcast distribution service in good conditions.

The aforementioned operation 303 of updating the context is obviously still active at this moment of the method and makes it possible to maintain the coherence of information between the different participating entities.

The group G01 to which the client C01 belongs is on the point of receiving messages in broadcast mode for the zone Z01 in which the triggering threshold has been exceeded.

A step 210 then intervenes, in which the broadcast participating entity EPB serving the distribution zone emits a message called switch over warning message for the destination of the unicast participating entities EPU to inform the unicast entities having clients of the targeted group G01 in the considered zone Z01 that the broadcast mode is going to be activated for this group G01 in the zone Z01. The redundancy of distribution of messages to these clients will then be avoided. Indeed, the unicast participating entity EPU will cease to emit to these clients, as long as they are in reception of the broadcast mode; the participating entity EPU will have been able to identify these clients by the warning message broadcasted by the broadcast function in step 210. The broadcast participating entity EPB only emits a single copy of the messages destined for the group G01 for the different clients in the zone Z01; messages obtained thanks to the operation of junction to the group multicast address during step 302.

A step 211 also intervenes in which the broadcast participating entity EPB emits to all the clients of the group G01 present in the zone Z01, an information message informing the considered clients that they can switch to broadcast communication mode. This message is distributed to the clients using the broadcast communication mode.

The broadcast communication mode is then actually adopted, for all the clients of the group G01 in the zone Z01, in a step 212.

A client, for example the client C01, is then capable of emitting, in a step 213, a message called unavailability information message for the destination of the signaling participating entity EPS that controls it indicating that it is no longer in a state to receive the broadcast distribution in acceptable quality conditions or that it no longer wishes to do so. This situation may be observed for example if the client in question leaves the zone Z01 or if the resources enabling the broadcast distribution are pre-empted. The updating of the tables L1, L2 and L3 of the context is then carried out in an operation 303, as previously, and a distribution in unicast mode is once again activated in a step 214 by the participating entity EPU that serves them to each of the clients concerned by this change of distribution mode.

In the hypothesis where the client having emitted an unavailability information message in step 213 is once again able to receive the broadcast distribution mode (for example following a return to the zone Z01), it emits once again, in a step 215, an availability message for the destination of the signaling participating entity EPS that controls it. Once again, the updating of the tables L1, L2 and L3 of the context is carried out in an operation 303, and the broadcast communication mode is once again accessible for the considered client, which consequently no longer receives in unicast mode at least for the messages destined for the group G01.

In the example described, a step 217, called step of interruption of the broadcast mode for a given group, may intervene when the broadcast participating entity EPB interrupts the distribution in broadcast mode for the considered group G01 in the zone Z01. An information message of interruption of broadcast distribution is then communicated to the different unicast participating entities serving the clients of the group G01 in the zone Z01 by transmission on the software bus 102 thanks to the multicast address of the zone Z01; a similar message is sent in a step 219 to the set of concerned clients in broadcast mode—that is to say to all the clients of the considered group in the broadcast distribution zone. Such a situation may occur for example for reasons of limitation in capacity of the broadcast participating entity: this may have been provided to distribute in broadcast mode to a maximum number of groups, for example ten. If the triggering threshold is exceeded for more than ten groups, a choice has to be made to determine which group will not be or will no longer be distributed in broadcast mode. This choice is made according to previously determined criteria, for example by favouring certain groups compared to others as a function of their activity, or instead by favouring the groups which first passed into broadcast mode, or groups for which the number of clients in the broadcast distribution zone is the highest.

The distribution in unicast mode is then repeated in a step 219 to the private clients of the broadcast distribution mode.

The table below lists, considering the example that has just been described, the set of commands conveyed by the software bus 102.

| Command | Emitter | Addressee(s) | Transport mode |
| --- | --- | --- | --- |
| 202 affiliation information | EPS | EPU | Unicast |
| 203 affiliation information | EPS | EPB | Unicast |
| 204 acknowledgment | EPU | EPS | Unicast |
| 205 acknowledgment | EPB | EPS | Unicast |
| 207 distribution broadcast available | EPB | EPUs | Multicast @Zone |
| 208-a opening broadcast session | EPU | EPS | Unicast |
| 210 switch over warning | EPB | EPUs | Multicast @Zone |
| 217 interruption of the broadcast mode | EPB | EPUs | Multicast @Zone |

Thus, in an aspect of the invention, it is possible to consider zone by zone, group by group, if the distribution of messages from the different participating entities takes place in broadcast mode or in unicast mode.

Moreover, in an aspect of the invention, it is made possible for a given client to receive simultaneously messages in broadcast mode within the context of its belonging to a first group, and in unicast mode within the context of its belonging to a second group.

A practical case illustrating the interest of such a possibility may consist in a client consisting of a terminal of a fire chief: if he is situated in an intervention zone, his team, which belongs to his first communication group, is situated in the same geographic zone as he is. The distribution in broadcast mode could then beneficially be activated according to the method that has just been described for this first communication group. If in a same time this terminal is also affiliated to a second group, for example linked to the municipal council of his town, the unicast mode will be maintained for this second communication group, during his intervention with his firefighting team.

It should be noted that the coverage of a vast territory, for example the whole of a country, is not necessarily ensured in broadcast mode over its entire extent. The broadcast mode, expensive to deploy, can advantageously be activated in zones where a high population density is potentially observable.

Finally, it should be noted that the invention is not limited to the use of a broadcast distribution mode of MBMS type for the LTE standard for which the considered distribution zones are MBSFN zones (MBSFN Area according to the LTE standard) The invention applies equally when the distribution mode used is the so-called SC-PTM (Single Cell Point-To-Multipoint) mode in which case the considered distribution zones are the coverage zones of a single cell.

Having described and illustrated the principles of the invention with reference to various embodiments, it will be recognized that the various embodiments can be modified in arrangement and detail without departing from such principles. It will be appreciated that the different concepts and aspects of the invention described above can be implemented, for example, using one or more processors, modules, machine executable instructions, computers and/or servers. It should be understood that the concepts and aspects of the invention described herein are not related or limited to any particular type of computing environment, unless indicated otherwise. Various types of specialized computing environments may be used with or perform operations in accordance with the teachings described herein. Elements of embodiments shown in software may be implemented in hardware and vice versa.

One or more devices, processors or processing devices may be configured to carry out the function(s) of each of the elements and modules of the structural arrangement described herein. For example, the one or more devices, processors or processing devices may be configured to execute one or more sequences of one or more machine executable instructions contained in a main memory to implement the method(s) or function(s) described herein. Execution of the sequences of instructions contained in a main memory causes the processors to perform at least some of the process steps or function(s) of the elements described herein. One or more processors in a multi-processing arrangement may also be employed to execute the sequences of instructions contained in a main memory or computer-readable medium. In alternative embodiments, hard-wired circuitry may be used in place of or in combination with software instructions. Thus, embodiments are not limited to any specific combination of hardware circuitry and software. The term "computer-readable medium" as used herein refers to any medium that participates in providing instructions to a processor for execution. Such a medium is non-transitory and may take many forms, including but not limited to, non-volatile media, volatile media, and transmission media. Non-volatile media include, for example, optical or magnetic disks. Volatile media include dynamic memory. Transmission media include coaxial cables, copper wire and fiber optics. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or other medium from which a computer can read. Various forms of computer readable media may be involved in carrying one or more sequences of one or more instructions to processor for execution.

Computer programs comprising machine executable instructions for implementing at least one of the steps of the methods, and/or aspects and/or concepts of the invention described herein or function(s) of various elements of the structural arrangement described herein can be implemented by one or more computers comprising at least an interface, a physical processor and a non-transitory memory (also broadly referred to as a non-transitory machine readable or storage medium). The computer is a special purpose computer as it is programmed to perform specific steps of the method(s) described above. The non-transitory memory is encoded or programmed with specific code instructions for carrying out the above method(s) and its/their associated steps. The non-transitory memory may be arranged in communication with the physical processor so that the physical processor, in use, reads and executes the specific code instructions embedded in the non-transitory memory. The interface of the special purpose computer may be arranged in communication with the physical processor and receives input parameters that are processed by the physical processor.

It will be appreciated by one skilled in the art that the disclosed arrangements and methods described herein represent a solution to the technological problem described above.

The invention claimed is:

1. A communication system for the transmission of group multimedia data to a set of multimedia clients, each multimedia client being affiliated to at least one communication group, said communication system comprising:
   at least one control entity;
   at least one signaling participating entity;
   at least one participating entity, which is a unicast entity, supporting a unicast distribution service;
   at least one participating entity, which is a broadcast entity, supporting a broadcast distribution service;
   media sessions for one or more multimedia group communications being established between the at least one control entity and the at least one participating unicast entity and between the at least one control entity and the at least one participating broadcast entity,
   wherein the at least one signaling participating entity and the at least one participating unicast entity each serving at least one sub-set of multimedia clients of the set of multimedia clients, independently of a geographic location of said multimedia clients;
   wherein the at least one participating broadcast entity serving local multimedia clients of the set of multimedia clients in a given geographic zone, independently of the signaling participating entity serving said local multimedia clients;
   said communication system further comprising:
   a software bus linking different participating entities to convey information messages exchanged between the different participating entities, wherein the different participating entities include the at least one signaling participating entity, the at least one participating unicast entity, and the at least one participating broadcast entity;
   said information messages comprising update data for enabling each participating unicast entity to maintain up to date a first list and a second list and enabling each participating broadcast entity to maintain up to date a third list;
   wherein the first list containing, for each communication group to which has become affiliated at least one multimedia client served by said participating unicast entity, the multimedia clients affiliated to said group and served by said unicast entity;
   wherein the second list containing, for each geographic zone in which is situated at least one multimedia client served by said participating unicast entity, the multimedia clients situated in said geographic zone and served by said participating unicast entity;
   wherein the third list containing for each communication group to which has become affiliated at least one multimedia client present in a geographic zone served by said participating broadcast entity, among said set of multimedia clients, the multimedia clients that are affiliated to said communication group and that are present in said geographic zone.

2. The communication system according to claim 1, comprising a unicast distribution participation function and a broadcast distribution participation function distributed respectively over a plurality of participating entities supporting a unicast distribution service, and over a plurality of participating entities supporting a broadcast distribution service.

3. The communication system according to claim 1, comprising a signalling participation function installed on a single signaling participating entity.

4. The communication system according to claim 1, wherein the emission, by a multimedia client of the set of multimedia clients, of a message of affiliation to a communication group to the signaling participating entity which manages said multimedia client causes the sending by said signaling participating entity of an information message of affiliation: on the one hand, to one of the participating unicast entities, said participating unicast entity updating the first list and the second list; on the other hand, to one of the participating broadcast entities, said participating broadcast entity updating the third list.

5. The communication system according to claim 1, wherein each participating broadcast entity emits a message of availability of a broadcast distribution service in a geographic zone served by said participating broadcast entity, the availability message being emitted to a set of participating unicast entities serving clients located in said geographic zone when a number of multimedia target clients affiliated to a same developed group is above, in said geographic zone, a previously determined threshold.

6. The communication system according to claim 5, wherein each participating broadcast entity having emitted the availability message, after each target client terminal has emitted a message indicating its availability to receive a broadcast distribution mode, emits a warning message of switching over to the broadcast distribution mode to the set of participating unicast entities having target clients of the same developed group in said geographic zone, the set of participating unicast entities then ceasing to emit in unicast distribution mode to said target clients; the broadcast distribution mode then being implemented to the target clients.

7. The communication system according to claim 6, wherein the broadcast distribution mode is maintained to each target client as long as the considered target client has not emitted an information message of broadcast reception unavailability.

8. The communication system according to claim 7, wherein the broadcast distribution service is of MBMS type for the LTE standard, or of SC-PTM type.

9. A communication method for the transmission of group multimedia data to a set of multimedia clients, said method being implemented in a system according to claim 1, each multimedia client being affiliated to at least one communication group, said communication method comprising the implementation of:
at least one control entity;
at least one signaling participating entity;
at least one participating entity, which is a unicast entity, supporting a unicast distribution service;
at least one participating entity, which is a broadcast entity, supporting a broadcast distribution service;
media sessions for one or more multimedia group communications being established between the at least one control entity and the at least one participating unicast entity and between the at least one control entity and the at least one participating broadcast entity,
wherein the at least one signaling participating entity and the at least one participating unicast entity each serving at least one sub-set of multimedia clients of the set of multimedia clients, independently of a geographic location of the multimedia clients;
wherein the at least one participating broadcast entity serving local multimedia clients of the set of multimedia clients in a given geographic zone, independently of the signaling participating entity serving said local multimedia clients;
said communication method comprising:
using a software bus linking different participating entities to convey information messages exchanged between the different participating entities, wherein the different participating entities include the at least one signaling participating entity, the at least one participating unicast entity, and the at least one participating broadcast entity;
updating, by means of update data of said information messages, each participating unicast entity by maintaining up to date a first list and a second list and each participating broadcast entity by maintaining up to date a third list;
wherein the first list containing, for each communication group to which has become affiliated at least one multimedia client served by said participating unicast entity, the multimedia clients affiliated to said group and served by said unicast entity;
wherein the second list containing, for each geographic zone in which is situated at least one multimedia client served by said participating unicast entity, the multimedia clients situated in said geographic zone and served by said participating unicast entity;
wherein the third list containing for each communication group to which has become affiliated at least one multimedia client present in a geographic zone served by said participating broadcast entity, among the set of multimedia clients, the multimedia clients that are affiliated to the communication group and that are present in said geographic zone.

* * * * *